Oct. 30, 1962 H. G. LIEN 3,061,358
TRUCK BODY COVER ASSEMBLY
Filed June 15, 1959 3 Sheets-Sheet 1

INVENTOR.
HAROLD G. LIEN
BY Duggert Johnson

ATTORNEYS

Oct. 30, 1962  H. G. LIEN  3,061,358
TRUCK BODY COVER ASSEMBLY
Filed June 15, 1959  3 Sheets-Sheet 2
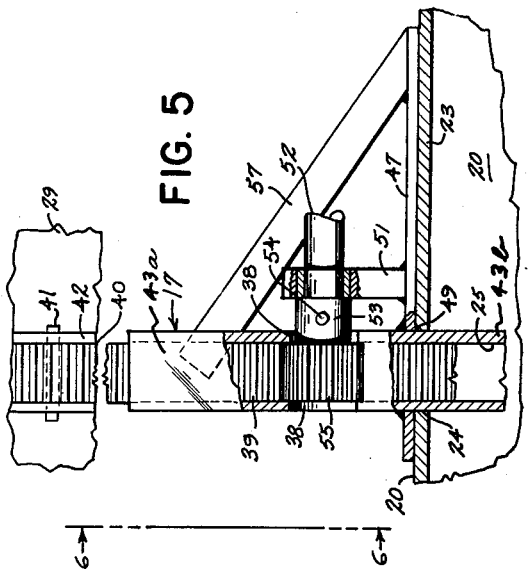
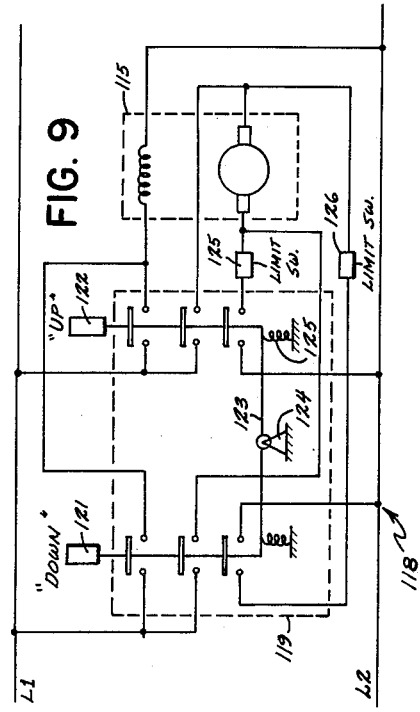
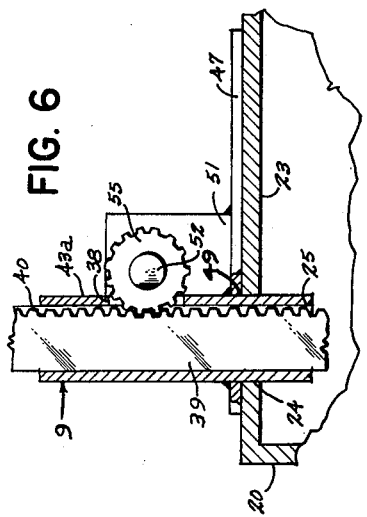
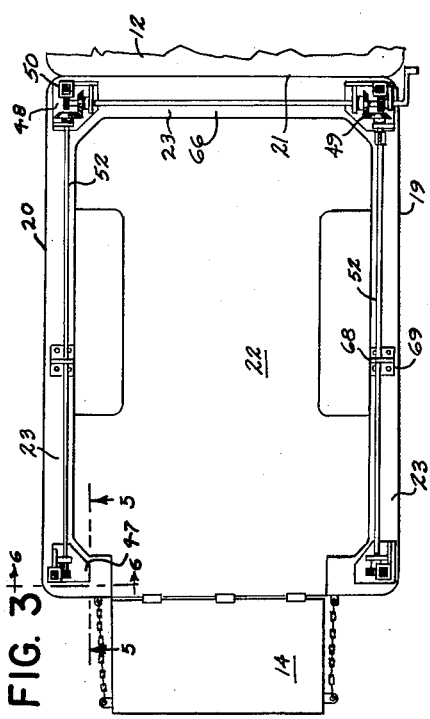
INVENTOR.
HAROLD G. LIEN
BY *Dugger & Johnson*
ATTORNEYS Oct. 30, 1962

H. G. LIEN 3,061,358

TRUCK BODY COVER ASSEMBLY

Filed June 15, 1959

INVENTOR.
HAROLD G. LIEN

BY *Dugger & Johnson*

ATTORNEYS

United States Patent Office 3,061,358
Patented Oct. 30, 1962

1

3,061,358
TRUCK BODY COVER ASSEMBLY
Harold G. Lien, Minneapolis, Minn., assignor to Bishman Manufacturing Company, Osseo, Minn., a corporation of Minnesota
Filed June 15, 1959, Ser. No. 820,190
1 Claim. (Cl. 296—26)

This invention relates to a new and novel truck box cover assembly. More particularly this invention relates to a new and novel truck box cover assembly that may be alternately translated between a position bearing against the truck box to form a tight closing fit with said box wherein the cover member has a top elevation substantially the same as the height of the truck cab and a second position in which the cover member is elevated above the truck box to provide standing room in said truck box.

There are many activities where it is desirable to equip the truck box with a plurality of tools and other equipment so as to have a mobile work shop or with other appropriate equipment such as camping equipment. For example a stove, bunks and other equipment may be placed in the truck box and used in said box when the truck is being used for hunting, fishing, or outings of other various types. Another example of the manner in which the truck box may be equipped, is to place appropriate office equipment in the truck box so that the truck may be used in supervising activities on road construction jobs.

In the aforementioned activities, it is desirable to provide a truck box closure member to keep the "elements" of the tools and/or equipment located in the truck box when the facilities in said box are not being used and at the same time provide a relatively low closure member so as to minimize the amount of wind resistance against the movement of the truck when said truck is moved from one location to another. When the truck is "stopped," it is desirable to provide sufficient head room under the closure member so that a party may work in a standing position in said aforementioned "workshop" and still be protected from the sun and other "elements." In using the closure members of the prior art to achieve the aforementioned purposes, it is necessary to enclose the truck box with structure that extends substantially higher than the cab and thereby decreases the roadability of the truck, or to provide closure member structure which requires considerable time and effort to disassemble and pack preparatory to traveling and also requires considerable time and effort to reassemble for use, or to use closure structure that includes a top mounted at such a low elevation that it is impossible for the average person to stand upright in the truck box. To overcome the disadvantages of the truck box closure members of the prior art, this invention has been made.

An object of this invention is to provide a new and novel truck box cover assembly. A still further object of this invention is to provide a new and novel truck box cover assembly that is adjustably positionable to provide standing room in the truck box when the truck is in a standing position and at the same time positionable so as to provide a minimum amount of resistance to movement to the truck and still protects the equipment in the truck box from the elements.

It is an additional object of this invention to provide apparatus for translating a cover member between an elevated and a lowered position that substantially leaves the tailgate and the open portion of the box free of truck box cover assembly structure.

A still further object of this invention is to provide a truck box cover assembly that is manually movable between a position forming a close fit with the truck box and a position overlying the truck box to provide standing room in said truck box. It is still another object of this invention to provide a truck box cover assembly that is power operated between a position forming a close fit with the truck box and a second position to overlie the truck box and still provide standing room in said truck box. Another object of this invention is to provide a relatively inexpensive but sturdy truck box cover assembly that may be readily mounted on existing models of trucks.

Other and further objects are those inherent in the invention herein illustrated, described in the claim, and will be apparent as the description proceeds. To the accomplishment of the foregoing and related ends, this invention then comprises features hereinafter fully described and particularly pointed out in the claim, the following description setting forth in detail certain illustrative embodiments of the invention, these being indicative, however, of but a few of the various ways in which the principles of the invention may be employed.

The invention as illustrated by the reference to the drawings in which the corresponding numerals refer to the same parts and in which:

FIGURE 3 is a fragmentary top sectional view of the mounting of the lift assembly on the truck box, said lift assembly being used for translating the cover member between a use position and a travel position, said view being taken along the line and looking in the direction of the arrows 3—3 of FIGURE 1;

FIGURE 5 is an enlarged fragmentary vertical elevational view of the lift mechanism located in one of the rear corners of the truck box, said view being generally taken along the line and looking in the direction of the arrows 5—5 of FIGURE 3 and in part being shown in section;

FIGURE 6 is an enlarged fragmentary rear view of the lift mechanism illustrated in FIGURE 5, said view being taken along the line and looking in the direction of the arrows 6—6 of FIGURES 3 and 5;

FIGURE 9 is a schematic illustration of the electric circuitry and the component parts for operating and controlling the motor means used to elevate and lower the cover assembly of the second embodiment of this invention.

Figure 2:
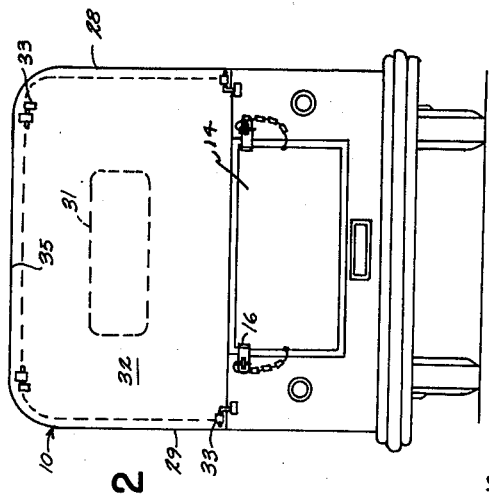
FIGURE 2 is a rear view of the truck with the truck box cover assembly mounted thereon, said view showing the assembly in a closed travel position.
Figure 1:
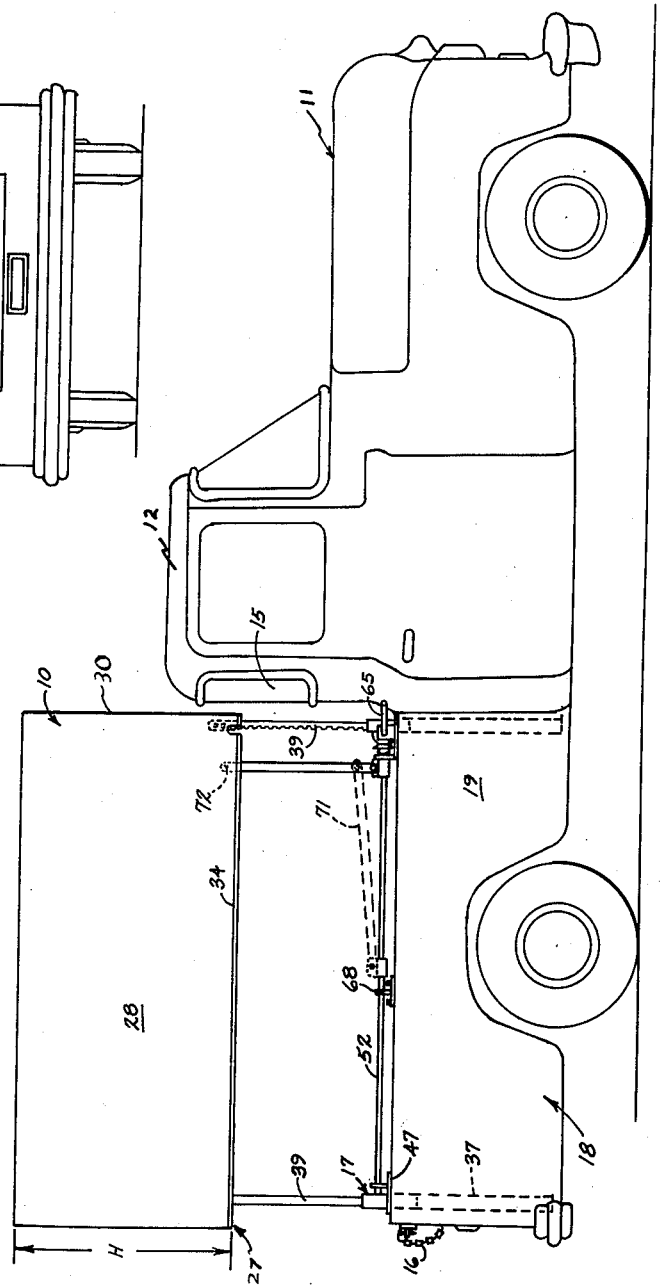
FIGURE 1 is a side elevational view of a truck having a truck box cover assembly of this invention mounted thereon, said assembly being shown in an elevated use position. The lock arm is shown in a locked position in full lines and in a travel position in dotted lines.
Figure 4:
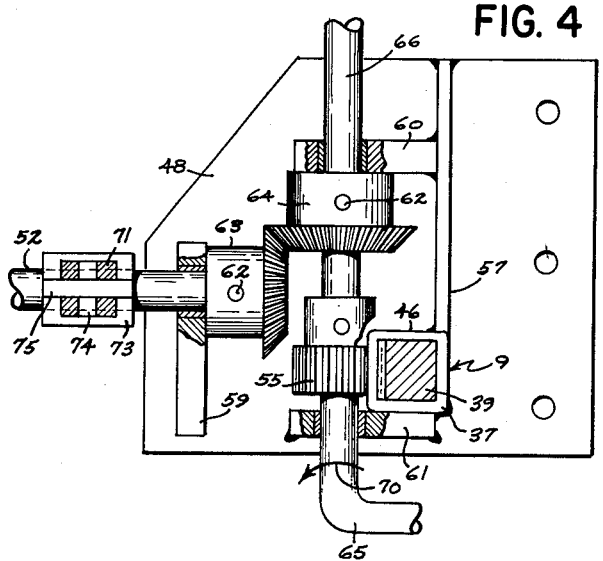
FIGURE 4 is an enlarged top view of the lift mechanism located at the right front corner of the truck box, parts of said mechanism being shown in section.
Figure 8:
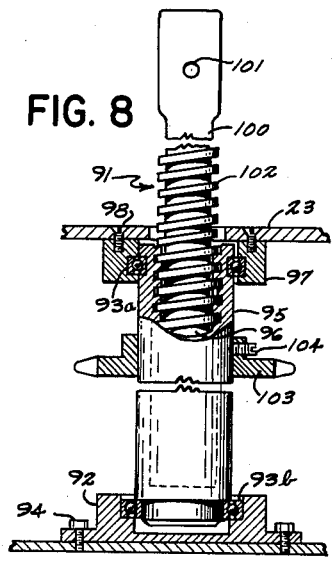
FIGURE 8 is a vertical view of the lift assembly which is located at one corner portion of the truck box, said view being generally taken along the line and in the direction of the arrows 8—8 of FIGURE 7 and in part being shown in section.
Figure 7:
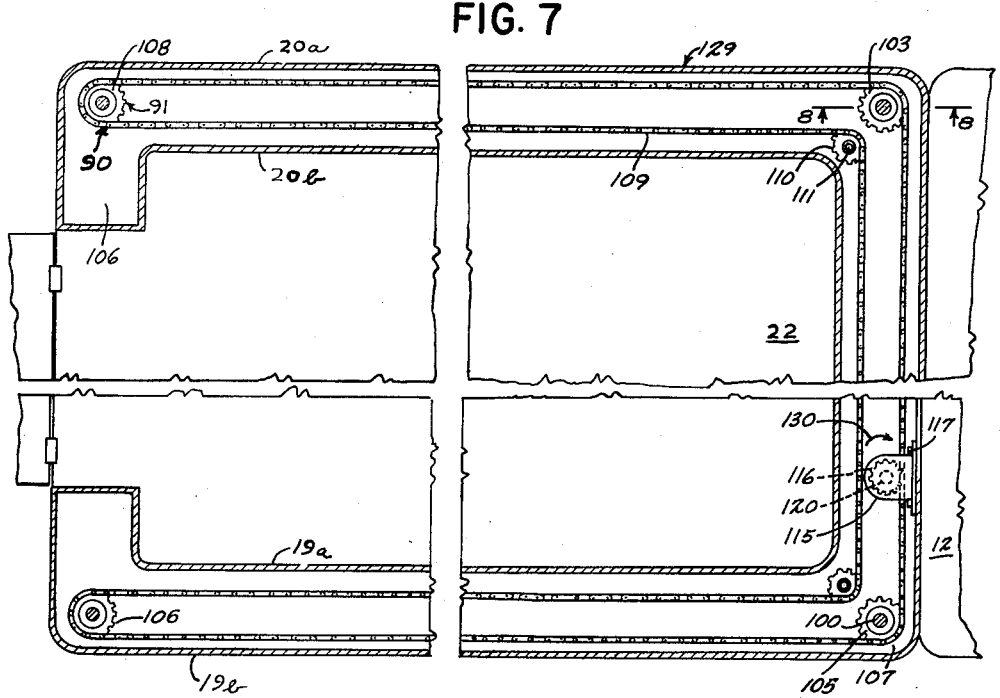
FIGURE 7 is a fragmentary horizontal sectional view of a second embodiment of the truck box cover assembly of this invention.

Referring now in particular to FIGURES 1 and 2 there is illustrated a truck 11 that has a cab 12, a truck box 18, and a tail gate 14 mounted on said truck box. The truck box includes a floor 22, front wall 21 and side walls 19, 20. The side walls and the front wall each have a generally horizontal flange portion 23.

Mounted on the truck box for movement between an elevated use position and a travel position is a truck box cover assembly, generally designated 10, of my invention. The truck box cover assembly includes a cover member 27 which has a top 35, side walls 28, 29, a front wall 30 having a window 31 mounted therein, and a rear closure member 32 that is detachably secured by latch members 33 to the top and side walls for closing the rear opening formed by said side walls and top walls. The top and side walls may be made out of a single corrugated sheet of metal. As may be noted, the side walls 28 are of a height H that is substantially equal to the height of the portion of the cab above the truck box 18.

Each of the side walls has a flange portion 34 that extends outwardly over the respective side walls 19, 20 and front wall to form a close fit therewith when the closure member is moved to a travel position. Similarly the rear closure member may be formed with a flanged portion to overhang the tail gate 14 when said tail gate is retained in a closed position by latch means 16.

A cover member lift assembly 9 which includes a rack 39 and a housing 37, is mounted in each of the front and back corner portions of the truck box, there being an aperture 24 formed in each end of the sidewall flanges 23. A vertically extending rack housing 37 is mounted to extend downwardly through each aperture. Each rack housing is of a length to extend downwardly to approximately the level of floor 22 and to extend a substantial distance upwardly above the respective side wall. If desired, the rack housing may be extended downwardly below the floor but for most purposes it need not be so extended. The lower end of the housing is closed to prevent dirt and other miscellaneous material from getting into said housing.

Each housing has a rectangular section cut out of the housing wall 43a and a curved section cut out of walls 43b to form an opening 38. Each opening is located a substantial distance above the side wall flanges and at approximately the same elevation as each of the other openings. The purpose of providing the aforementioned openings will become apparent hereinafter.

Mounted for movement in a vertical direction in each of the housings 37 is a rack 39. Each rack is mounted in the housing to have the toothed portion 40 adjacent the side wall 43a which has an opening 38 formed therein.

The upper end of each rack is pivotally secured to a bracket 42 by a pivot 41. The brackets 42 in turn are secured to the respective inner corner portions of the cover member to be located adjacent the side flanges 34. The aforementioned pivotal connections help minimize binding that otherwise would occur when the cover member is translated between an elevated "use" and a lowered "travel" position.

A rear mounting plate 47 having an aperture 49 formed therein is secured by conventional means (not shown) to the rear end portions of each of the side wall flanges 23 to have a housing extend upwardly through said aperture. Each rear mounting plate is also welded to the respective housing. Similarly a front mounting plate 48 having an aperture 46 formed therein is secured to the front end portions of the respective side wall flanges to have a housing extend upwardly the aperture 46. Each of the front mounting plates are welded to the housings extended therethrough.

Each of the back mounting plates has a block 51 welded thereto for journalling one end of a longitudinal extending rod 52, each rod in turn mounting a spur gear 55 such that a tooth portion of said gear extends inwardly through an opening 38 to drivingly engage the tooth portion of the rack. Each spur gear has a hub 53 which is fixedly secured to the end of a rod by means such as a set screw 54. An angular brace 57 is welded at one end to the upper end of the housing and extends downwardly and forwardly to have the other end welded to the mounting plate 47.

The central portion of each rod 52 is journalled for rotation in a bracket 68; there being a bracket 68 secured to each of the side wall flanges intermediate the front and rear mounting plates. The aforementioned brackets are secured to the side wall flanges by bolts 69.

A block 59 is secured to each of the front mounting plates for journalling the respective opposite end portions of the rods 52. A bevel gear 63 is secured to the aforementioned opposite end of each rod 52 by appropriate means such as a set screw 62. A second block 60 is welded to each aforementioned plate, each block 60 journalling one end portion of the transverse extending rod 66. A bevel gear 64 is mounted on each end portion of the rod 66 for drivingly engaging bevel gear 63. Also a spur gear 55 is mounted on each end of the rod 66 to be positioned outwardly from the adjacent bevel gear. Each of the spur gears on the rod 66 extend inwardly through opening 38 to drivingly engage the toothed portions of a rack 39.

The right outer end of the rod 66 has a crank 65 formed integral therewith, said crank being journalled for rotation in the block 61 which in turn is welded to the right front mounting plate. Although the crank is described as being formed integral with the rod 66, it is to be understood that a separate crank may be provided for rotating the rod 66.

Pivotally secured at one end to the side wall 28 adjacent the rack which extends through the right front plate 49 is a lock arm 71, said lock arm being secured to said side wall by pivot member 72. The opposite end of the lock arm is formed in the shape of a clevis and is pivotally secured to the sleeve offset 75 by a sleeve pivot 74. The sleeve offset is welded to a sleeve 73 which in turn is slidably mounted on the rod 52. The lock arm serves to add rigidity to the structure, to limit the upward movement of the cover member with respect to the box, and also to "lock" the cover member in an elevated position once said cover member has been raised to a fully elevated position.

Having described the structure of the first embodiment of my invention, I will now briefly describe the operation thereof. Assuming that the truck box cover assembly is in a "lower position" and that the truck has been moved to a location where it is desired to use the facilities within the truck box, the crank 65 is rotated in the direction of the arrow 70 to rotate the shaft 66 and the spur gears 55 which are mounted thereon. As shaft 66 rotates, the bevel gears 64 are rotated to drive the bevel gears 63. By rotating bevel gears 63 the rods 52 will be rotated to drive the spur gears 55 on the rear end thereof. As a result when the crank is rotated in the direction of the arrow 70 each of the spur gears 55 is rotated equal increments in a direction to move the respective rack in a vertical direction to raise the cover member which is attached to the upper end of said racks. As the cover member is elevated, the end of the lock arm 71 attached to the pivot 72 will move in an upward direction and thus draw the sleeve 73 towards the mounting plate 48. After the cover member has been elevated, and provided the lock arm has not already moved to a perpendicular position, the lower end of lock arm may be manually moved toward the mounting plate 48 so it will be perpendicular to the rod or moved slightly past the perpendicular position. As a result the lock arm will retain cover member in an elevated position.

When it is desired to lower the cover member, the lower end of the lock arm is manually moved away from the mounting plate 48 and thence the crank arm is rotated in a direction opposite the arrow 70 to simultaneously move the racks in a downward direction. Appropriate means (not shown) may be provided for locking the cover assembly in a travel position.

The structure of one embodiment of my invention having been set forth, I will now set forth the structure of a second embodiment of my invention. The second embodiment of the truck box cover assembly, generally designated 90, includes a cover member (not shown) of the same construction as illustrated for the first embodiment and is adaptable for mounting on a truck box of the same construction as previously described. The truck box cover assembly 90 includes a cover member lift assembly 91 mounted in each of the back corners 106 and front corners 107 of the truck box. Since each lift assembly is of the same construction only one of said assemblies will be described. A cover member lift assembly includes a mounting member 92 for rotatably retaining one end of the internally threaded sleeve 95, said mounting member in turn being fixedly secured to a corner portion of the truck box by conventional means such as bolts 94. A bushing 93b is mounted in an aperture formed in the mounting block 92, said bushing in turn being mounted on the lower end of the sleeve. The upper end of the sleeve has a bushing 93a mounted thereon, said bushing 93a being retained in the collar 97. The collar in turn is secured to a side flange 23 by conventional means such as screws 98.

A shaft 100 having external threads 102 of a pitch to match the threads 96 of the sleeve is mounted to have the threaded end thereof extend into said sleeve. A pivot aperture 101 is formed in the upper end of the shaft 100 so that a pivot 72 may be extended therethrough to secure said shaft to an appropriate pivot bracket 42, said shaft being secured against rotating about a vertical axis. Mounted on the sleeve intermediate the collar and the mounting member 92 is a spur gear 103, there being provided a set screw 104 to fixedly retain said spur gear on the sleeve. By rotating the spur gear 103 in the appropriate direction the sleeve 95 is rotated to raise or lower the shaft 100. For purposes of facilitating the description of this invention, the spur gears of the other cover lift assemblies have been designated 105, 106, and 108, respectively.

Rotatably mounted on each of the front corner portions 107 of the floor 22 intermediate the respective side panel portions 20a, 20b, and 19a, 19b are idler gears 110, said idler gears being mounted inwardly toward the center of the truck box from the respective adjacent spur gears 103 and 105. Each of the idler gears 110 is mounted on the shaft 111 which has the lower end thereof fixedly secured to the floor of the truck box by conventional means (not shown). A chain 109 extends around the left rear spur gear 108, thence forwardly over the left front spur gear 103 to be located on the outer side of the sleeve on which said left front gear 103 is mounted, and then transversely to extend over the right front spur gear 105 to be on the outer side of the sleeve on which said right front spur gear 105 is mounted. From the right front spur gear 105 the chain extends rearwardly to go around the right rear spur gear 106, then forwardly to extend over the right front idler 110 to be on the outer side of the idler shaft on which the idler is mounted, next transversely to the left front idler gear to be on the outer side of the idler shaft on which said idler is mounted, and thence rearwardly to the left rear spur gear 108. By extending the chain over the aforementioned spur gears in the above described manner, all of the sleeves 95 will be rotated equal increments in the same direction.

Power means is provided for raising and lowering the closure member and the shafts 100, the aforementioned power means includes a motor 115 having a motor shaft 120, said motor being secured to the truck box 18 by conventional means such as bolts 117. A drive gear 116 is mounted on the motor shaft 120 to drivingly engage the chain 109.

Suitable electric circuitry and controls, generally designated 118, may be provided for controlling the operation of the motor 115. The electric circuitry includes a main line L1, and a second main line L2 which are connected to suitable D.C. source (not shown). An On-Off-Reversing switch 119, a top limit switch 125, a bottom limit switch 126, and a motor 115 are connected by appropriate circuitry as illustrated in FIGURE 9 to control the operation of said motor in the manner set forth hereinafter.

By depressing the down switch member 121, appropriate electrical connections are made in the down section of the On-Off-Reversing switch 119 to energize the motor to turn in a direction for lowering the cover member. The bottom limit switch 126, which is operated by an arm (not shown) connected to the cover member, is actuated to said arm to open an appropriate circuit to stop the motor from further driving the spur gear 116 when the cover member has been translated to a fully lowered position and also to prevent the motor from being energized to rotate in a direction to further urge the cover member in a downwardly direction once said cover member has been translated to have the cover member bear against the truck box.

If it is desired to elevate the closure member the up switch member 122 of switch 119 is depressed. The switch member 122 makes or closes appropriate electric circuit connections in the "Up" section of the switch 119 to energize the electric motor 115 to rotate in the direction for driving the chain to elevate the shafts 100 and the cover member which is connected thereto. The top limit switch 125, which may be operated by the aforementioned arm (not shown), operates to turn off the electric motor once the cover member has been fully elevated, and to prevent the motor from being energized to rotate in a direction to further elevate the cover member once it has been translated to a predetermined height.

The down switch member 121 and the up switch member 122 are pivotally connected to the opposite ends of the arm 123 which in turn is pivoted about a pivot member 124. A spring 125 is connected to each of the opposite ends of the arm 123 to bias the arm to a neutral "off" position. As a result upon releasing the pressure on either the down switch member 121 or the up switch member 122, the aforementioned members are biased to an "off" position through the action of spring 125. The electric circuitry and controls for operating the motor is merely exemplary of the type of circuitry and controls that may be used and is not to be considered a limitation of the invention herein described.

Having described structure of the second embodiment of my invention, I will now briefly describe the operation thereof. Assuming that the closure member is in a lowered travel position and the truck has been driven to a location where it is desired to make use of the facilities in the truck box, the up switch member 122 is depressed to close appropriate electric circuits for energizing the motor 115 to rotate in a direction for raising the closure member which is mounted on the upper end of the shafts 100. That is, the motor rotates in the direction of arrow 130 to drive the chain 109 which in turn drives the spur gears 103. Rotating the spur gears will rotate the sleeves for elevating the shafts 100 and the closure member connected to said shafts. After the closure member has been raised a desired amount, the switch 119 may be thrown to an off position, or if a top limit switch 125 is provided means (not shown) will operate said limit switch to open an electric circuit to de-energize a portion of the motor 115 so that it will stop rotating in the direction of arrow 130. Now if it is desired to lower the cover member for any reason, for example, to drive the truck a substantial distance, the switch member 121 is moved to a "down" position to energize the motor for turning the motor shaft in the opposite direction of arrow 130 to translate the closure member to a travel position. Once the cover member has been lowered, the manual pressure against switch 119 may be withdrawn so that said switch will assume an "Off" position, or if a bottom limit switch is provided, the arm (not shown) will operate the limit switch so the limit switch will de-energize the electric motor to prevent said motor from further rotating in the direction opposite arrow 130.

By providing the above described structure for translating the cover member between an elevated and a closed position, wherein the members for operating the lift assemblies extend along or are mounted on the two side panels and the front wall of the truck box, a big advantage is obtained in that the tailgate portion is free of structure that would interfere with loading or entering the truck box and that would substantially reduce the effective usable area in the truck box. Also by providing the aforementioned lift assemblies the cover member may be elevated so that a party in the truck box can view the outside area on all sides of the truck.

A further modification of this invention is to provide a flexible curtain or curtains that at their upper edges are secured to the cover member and at their lower edges secured to the truck box. A special flap may be provided for the rear end of the truck box that may be opened at the same time the tailgate and/or rear closure member is opened. The flexible curtain may be, for example, netting to keep out the various insects, such as mosquitoes, when the closure member is elevated, transparent plastic sheets such as polyethylene which will keep out the elements but not the light, or canvas. Special rollers may be provided, and if so, the lower edges of the curtain, other than the flap, if one is provided, may be secured to said rollers instead of the truck box and the rollers in turn secured to the appropriate walls of said box. In such an event the curtain would automatically be "stored" when the cover is lowered.

It is to be understood that even though the truck box closure assembly has been described and illustrated with reference to one model of truck, it may be readily constructed adaptable to be used with other models and types of trucks. For example, if the truck box on which the cover assembly of the second embodiment is to be mounted is not shaped so that the drive chain may be mounted between the side wall panel portions, a generally U-shaped housing may be provided to substantially enclose the sleeves and other drive mechanism. In the event a housing is provided, it is desirable that it be shaped to extend adjacent to the perimetric edges of the floor which are adjacent to the front and side walls. If a special housing is used, a horizontal extension member may be secured to the upper end of each shaft to extend outwardly therefrom to be secured to the cover member.

Further it is within the purview of this invention that the truck box cover assembly may be adapted for use on a flat bed truck. In such an event suitable structure would be provided for securing the rack housing to the truck bed and for holding the rods 52, 66 in an elevated horizontal position or for mounting the lift assemblies and drive mechanism of the second embodiment as previously described. The pivot brackets would be mounted a higher elevation relative to the lower edges of the cover member than heretofore described. If necessary additional lift assemblies may be provided and mounted intermediate the assemblies mounted in the corner portions of the truck floor.

Additionally it is within the purview of this invention that power means other than the means described may be used for elevating and lowering the cover member. For example each sleeve and shaft combination may be replaced with a piston-cylinder combination and appropriate fluid lines and controls so that the piston rods simultaneously move equal increments in the same direction.

As many widely apparently different embodiments of this invention may be made without departing from the spirit and scope thereof, it is to be understood that I do not limit myself to the specific embodiments herein.

What I claim is:

For a truck that includes an open top truck box having a front wall, side walls, and an open end, a cover assembly comprising a cover member for said truck box, a plurality of depending support members attached to said cover member at spaced positions above said side walls and adjacent the cover assembly corner portions, means for each support member mounted on the truck box beneath the respective support member for moving the respective support member for alternately raising the support member to elevate the cover member and lowering the support member to lower the cover member, and drive means of generally U-shaped configurations for simultaneously operating said support member moving means to move the support members equal increments in the same vertical direction, said drive means being connected to each support moving means and mounted on the truck box to extend only along the front and side walls of said box, said drive means including a horizontal drive rod mounted on one of said side walls, and elongated means attached to the cover member for selectively holding said cover member in an elevated position, the last mentioned means including an elongated lock arm having one end pivotally attached to the cover member and a sleeve slidably mounted on said drive rod, the opposite end of the lock arm being pivotally attached to said sleeve.

References Cited in the file of this patent

UNITED STATES PATENTS

| | | |
|---|---|---|
| 1,964,894 | Rohne | July 3, 1934 |
| 2,344,551 | Heinrich | Mar. 21, 1944 |
| 2,569,641 | Metherell | Oct. 2, 1951 |
| 2,581,556 | Rogers | Jan. 8, 1952 |
| 2,739,833 | Schenkel | Mar. 27, 1956 |
| 2,798,760 | Hille | July 9, 1957 |
| 2,879,103 | Hall | Mar. 24, 1959 |
| 2,893,780 | Ervine | July 7, 1959 |

FOREIGN PATENTS

| | | |
|---|---|---|
| 106,933 | Australia | May 25, 1938 |
| 250,506 | Germany | Nov. 30, 1911 |